United States Patent [19]
Peterson

[11] Patent Number: 4,789,904
[45] Date of Patent: Dec. 6, 1988

[54] VEHICLE MOUNTED SURVEILLANCE AND VIDEOTAPING SYSTEM

[76] Inventor: Roger D. Peterson, Rte. 1, Box 316, Sweeny, Tex. 77480

[21] Appl. No.: 14,793

[22] Filed: Feb. 13, 1987

[51] Int. Cl.$^4$ .................................... H04N 5/782
[52] U.S. Cl. .................................. 358/310; 358/108; 358/335; 360/5
[58] Field of Search ............... 358/310, 335, 906, 108; 360/5

[56] References Cited

U.S. PATENT DOCUMENTS

| | | | |
|---|---|---|---|
| 3,885,090 | 5/1975 | Rosenbaum | 358/105 X |
| 4,214,265 | 7/1980 | Olesen | 358/93 |
| 4,281,354 | 7/1981 | Conte | 360/5 |
| 4,630,110 | 12/1986 | Cotton et al. | 358/108 |

OTHER PUBLICATIONS

Parade Magazine, p. 15, Oct. 17, 1971.

Primary Examiner—Robert L. Richardson

[57] ABSTRACT

A vehicle mounted surveillance system is disclosed. The system comprises a camera and a control head mounted within the police vehicle and a video recorder housed in a fireproof, bulletproof and environmentally controlled vault mounted in the trunk of the vehicle. The surveillance system also includes a wireless microphone. The system may be manually or automatically activated and is powered off the battery of the vehicle.

15 Claims, 1 Drawing Sheet

VEHICLE MOUNTED SURVEILLANCE AND VIDEOTAPING SYSTEM

BACKGROUND OF THE DISCLOSURE

The present invention is directed to a surveillance system, particularly, a vehicle mounted surveillance system including a camera and video recorder for use by law enforcement personnel to videotape stops for routine traffic violations.

In law enforcement, the routine traffic stop can be deceptively safe or one of the most dangerous situations encountered by law enforcement personnel. This is particularly true where the motorist is stopped in a relatively isolated area by a lone police officer. In such situations, the police officer is vulnerable to attack. Police officers in such circumstances have been verbally abused, attacked and in some instances killed. Since typically there are no witnesses to such attacks, it is difficult to determine what actually happened. Often times, if the attack on the police officer is fatal, the case remains unsolved for lack of witnesses or other clues. The vehicle mounted surveillance system of the present invention will provide a deterrent to such abuse or attacks on police officers.

The surveillance system of the present disclosure provides an audio and video record of the traffic stop. Such a record will help deter crime and aid in the apprehension of criminals. The surveillance system of the present disclosure provides an audio and visual record which may be used for investigation and trial. It is particularly helpful in the driving while intoxicated cases. In such situations, the police officer controllably videotapes the driver weaving in and out of traffic and also videotapes roadside sobriety tests which may be used at the time of trial.

The surveillance system of the present disclosure may also provide important evidence in the event a police officer is accused of civil rights violations, abuse or wrongful arrest. The videotape recordings are also useful training aids which may be used to teach police academy trainees proper police procedure in dealing with the public. It is understood, however, that the use of the surveillance system of the present disclosure is not limited to police surveillance. The surveillance system may be used in any type of public or private transportation. For example, the surveillance system may be mounted in a bus so that recordings may be made at each stop or at locations along the bus route where trouble may occur.

SUMMARY OF THE DISCLOSURE

The invention of the present disclosure is directed to a vehicle mounted surveillance system. The surveillance system of the invention comprises a camera and control head mounted within the police vehicle and a video recorder housed in a fireproof, bulletproof and environmentally controlled vault mounted in the trunk of the police vehicle. The surveillance system also includes a wireless microphone which may be carried by the police officer. The surveillance system of the invention operates off the battery of the police vehicle and includes cables and connectors connecting all the components to form the complete system. The system is manually activated by the police officer upon stopping a motorist or to videotape driving behavior of a motorist. Alternatively, the surveillance system may be automatically activated upon receipt of a predetermined signal.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are, therefore, not to be considered limiting of its scope, for the invention may admit to other equally effective embodiments.

DETAILED DESCRIPTION OF THE PREFERRED EMBODIMENT

Figure 1:
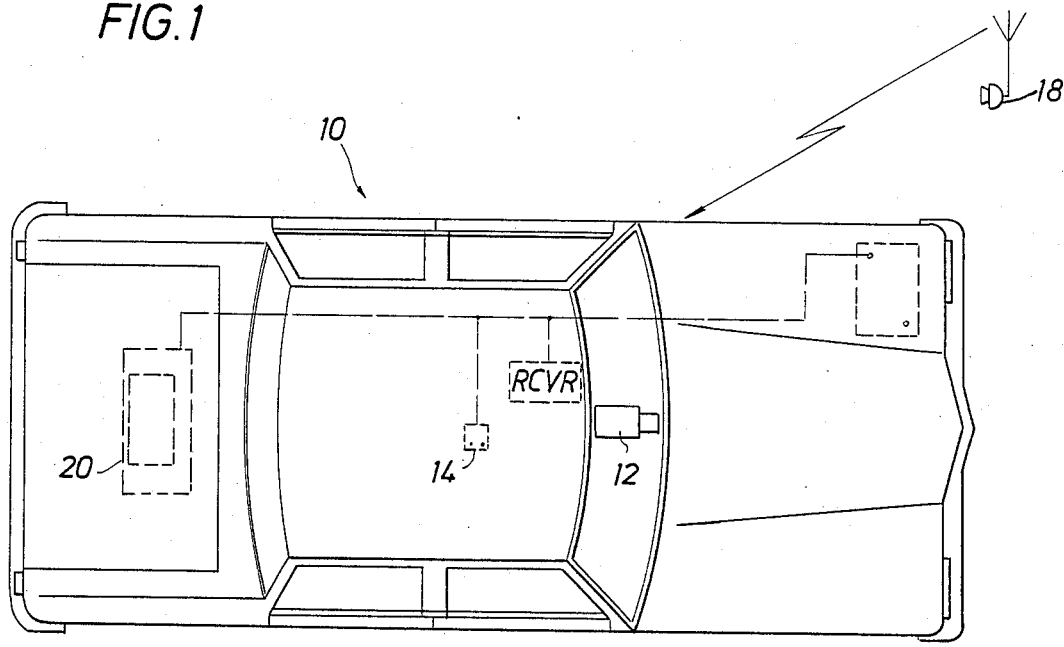
FIG. 1 is a plan schematic view of the surveillance system of the invention mounted in a vehicle.
Figure 2:
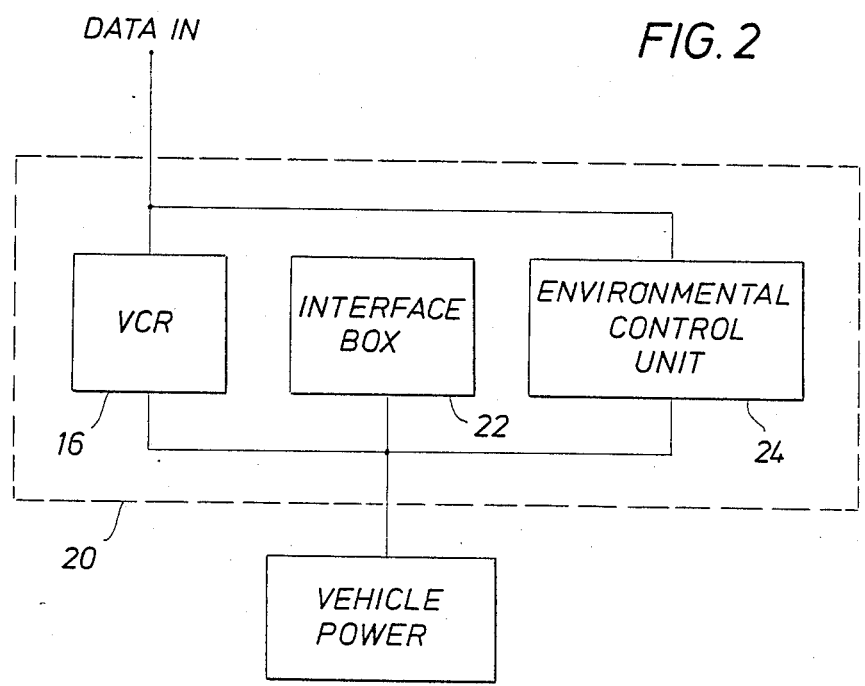
FIG. 2 is a schematic view of the vault housing the video recorder of the surveillance system.

Referring first to FIG. 1, the vehicle mounted surveillance system of the present disclosure is shown in schematic form mounted in a vehicle generally identified by the reference numeral 10. The surveillance system of the present disclosure comprises a camera 12, a control head 14, a video recorder 16, a wireless microphone 18 and a vault 20. The camera 12 is a miniature, all solid state, CCD black and white unit mounted inside the patrol car 10 on the dashboard or affixed to the windshield. The camera 12 includes a wide angle, high resolution lens and views the scene in front of the patrol car through the front windshield. The compact size of the camera 12 insures that it does not obstruct or interfere with the police officer's line of vision. The camera 12 is extremely durable so that it easily withstands the shocks encountered on the road, even during high speed pursuits. In the preferred embodiment, the camera 12 produces top-quality black and white videotape. However, a solid state miniature color camera may also be used.

The control head 14 is mounted in the driver's compartment of the patrol car. The control head 14 is located within easy reach of the police officer so that he may turn the surveillance system on and off at his discretion. Alternatively, an automatic mode may be selected so that the surveillance system of the invention is activated when the emergency flashing lights or siren on the patrol car are in use. The control head 14 is provided with an LED display and status indicators which display the status of the camera and video recorder. A flashing LED display indicates that the tape is nearing its end. The control head 14 may also include a low voltage indicator to alert the police officer regarding the operational status of the surveillance system. The system is operated off the battery of the patrol car; however, an auxiliary power pack is provided as a back-up power source for the microprocessor memory in the control head 14. When the wireless microphone 18 is turned on, the LED display shows that the microphone 18 is on permitting the police officer to quickly verify that the microphone 18 is operational.

The control head 14 is provided with two switches. One switch is the power on/off switch and the other is the record/stop switch. The control head 14 does not permit rewinding of the videotape, nor does the control head 14 permit rerecording over the videotape. These safety features are incorporated in the surveillance system to insure the integrity of the videotape so that it may be admitted as evidence in trial, if necessary.

The video recorder 16, interface box 22 and environmental control unit 24 are housed within the vault 20 which is mounted in the trunk of the patrol car 10. The vault 20 is a stainless steel vault secured with a tamper-resistant padlock. The vault 20 is fireproof and bulletproof. It is extremely durable, much like the flight recorder box on airplanes. The interior of the vault 20 is provided with a stamped aluminum insert having recesses for receiving the video recorder, interface box and environmental control unit. A foam insert in the lid of the vault 20 is provided to cushion the components of the system in the event an effort is made to open the vault 20 or the patrol car 10 is destroyed.

The vault 20 is an environmentally controlled steel vault, substantially box-like in shape having an upper portion hingedly connected to a lower portion. The two portions of the vault 20 close together and are securely locked by a padlock. The padlock is of heavy-duty construction so that it will withstand efforts to unlock it and thereby gain access to the video recorder housed within the vault 20. The vault 20 incorporates a heater and cooling element housed in the environmental control unit 24 to maintain the temperature within the vault 20 in the range of 40° F. to 90° F. The vault 20 is bolted in the trunk of the patrol car.

The surveillance system of the invention is powered by the battery of the patrol car 10. Cables and connectors connect the components of the surveillance system. The surveillance system includes a microprocessor housed in the control head 14 which monitors the status of the system insuring that the camera and video recorder are operational and functioning properly. The status of the surveillance system is displayed on the LED display of the control head 14. The police officer may, therefore, easily determine if a malfunction in the surveillance system occurs. An optional clock in the head 14 generates the time and date data stream preferably superimposed on the image to correlate the scene with the event.

When installed in a patrol car, the surveillance system of the present disclosure provides an unbiased record of the events occurring at the scene of a traffic stop or other police matter. The police officer may manually turn on the system which records everything with the view of the wide angle lens of the camera 12. The event is recorded on the video recorder, together with the date and time when the system includes the optional clock. An audio record is simultaneously made with the video record. The audio record includes the conversation of both the police officer and the motorist. A wireless microphone is attached to the police officer's uniform for recording both in and out of the patrol car. When using the surveillance system, the officer informs the motorist that he is being videotaped and that the conversation is being recorded. The surveillance system of the invention clearly records the identity of the motorist, license plates, make and model of the automobile and the conduct of both the officer and the motorist, including voice recordings from the wireless microphone on the officer's uniform. The surveillance system of the present disclosure provides a deterrent to attacks on police officers in pursuit situations or during routine traffic stops. The surveillance system disclosed herein also provides a record of the behavior of the motorist which may be used as evidence in claims of police abuse, wrongful arrest, or civil rights violations.

While the foregoing is directed to the preferred embodiments of the present invention, other and further embodiments of the invention may be devised without departing from the basic scope thereof, and the scope thereof is determined by the claims which follow.

What is claimed is:

1. A vehicle mounted surveillance system, comprising:
   (a) a camera;
   (b) a video recorder;
   (c) a control head for operator control by a person in the vehicle;
   (d) a vault for housing said video recorder;
   (e) power supply for providing power for operating said camera, said video recorder and said control head; and
   (f) connector means for interconnecting said camera, said video recorder and said control head to form a surveillance system operatively connected to said power supply to enable on/off operation thereof.

2. The system of claim 1 wherein said camera is a miniature, solid state, black and white, closed circuit camera with a wide angle lens including mounting means said camera for viewing through a vehicle window and wherein said mounting means positions said camera on the vehicle dash.

3. The system of claim 2 wherein said camera is mounted inside the vehicle on the front windshield.

4. The system of claim 1 wherein said camera is a color camera mounted on the light bar of the vehicle.

5. The system of claim 1 wherein said video recorder is an 8mm video recorder and is capable of recording visual data from said camera, and also has sound recording capabilities, and including a wireless microphone for transmitting sound to said recorder.

6. The system of claim 1 wherein said control head is mounted inside the vehicle, said control head including a power on/off switch and a record/stop switch subject to operator control.

7. The system of claim 6 wherein said control head further includes status indicator means for displaying the operational status of the surveillance system.

8. The system of claim 1 wherein said control head includes an LED display for displaying the date, time and operational status of the surveillance system.

9. The system of claim 1 wherein said vault is a closed bulletproof and fireproof chamber, said vault comprising two hinged portions secured by a padlock for closure.

10. The system of claim 9 wherein said vault includes a resilient, shock dampering insert, said insert including at least one recess for receiving said video recorder therein to cushion said video recorder from outside forces.

11. The system of claim 9 wherein said vault includes heating and cooling means for maintaining the temperature in said vault within the range of about 40° F. to about 90° F.

12. The system of claim 1 wherein said power includes battery pack to supply power to the surveillance system.

13. The system of claim 1 including clock means for displaying the date and time on the videotape of the surveillance system.

14. The apparatus of claim 1 wherein:

(a) mounting means positions said camera above the vehicle dash;
(b) said recorder is supported on a means for shock mounting in said vault;
(c) said vault is in the trunk of the vehicle;
(d) said connector means delivers control signals to said recorder in said vault for operation of said recorder;
(e) said control head includes means for advancing said recorder and has means preventing rewinding by an operator in the vehicle; and
(f) said control head further including means receiving sound transmission from a microphone.

15. The apparatus of claim 14 to further including status indicator means for displaying the operational status of the surveillance system.

* * * * *